Dec. 9, 1930.   A. W. ENGEL   1,784,227
SYSTEM FOR MOUNTING STEREOSCOPIC VIEWS
Filed June 2, 1928
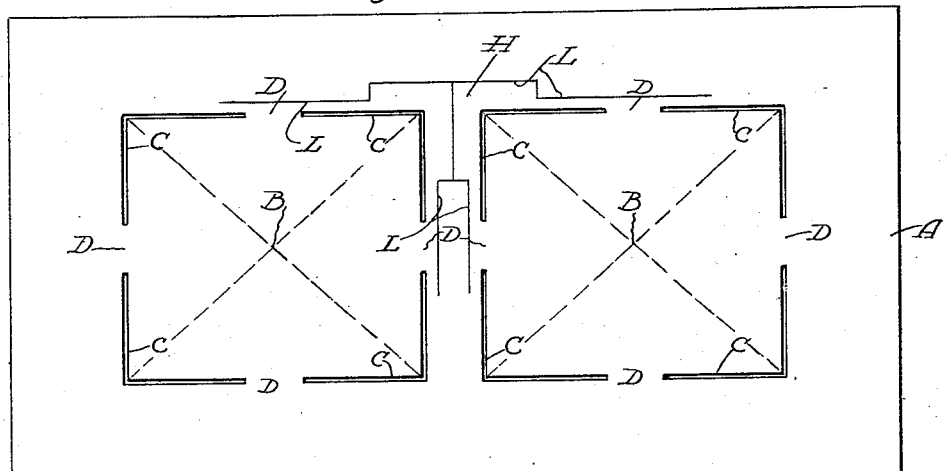
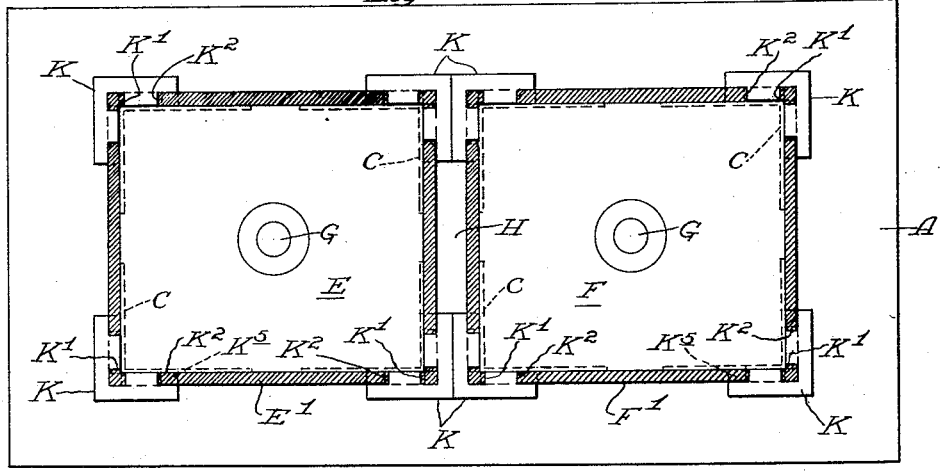
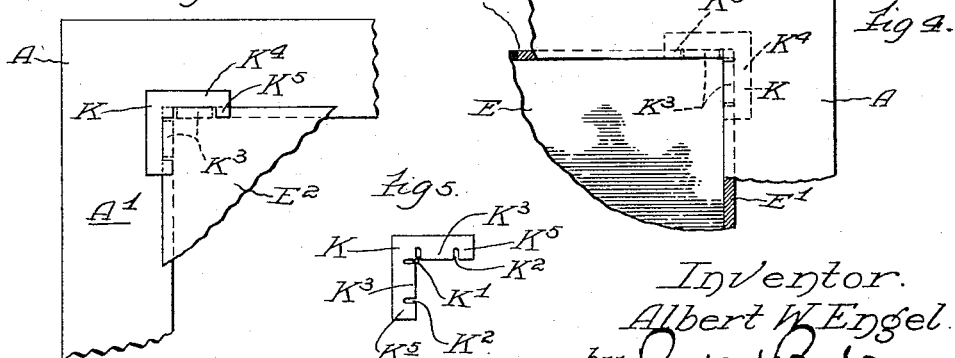

Patented Dec. 9, 1930

1,784,227

UNITED STATES PATENT OFFICE

ALBERT W. ENGEL, OF CHICAGO, ILLINOIS

SYSTEM FOR MOUNTING STEREOSCOPIC VIEWS

Application filed June 2, 1928. Serial No. 282,468.

The purpose of this invention is to provide a mount for the twin photographic prints which make up a stereoscopic view, such mount being specially designed to facilitate and insure correct placing of the two prints in relation to each other, while at the same time producing a neat and artistic effect. The invention consists in certain features of construction of the mount and also in the combination therewith of a preferred form of mounting means for attaching the prints thereto, as herein shown and described, and as indicated by the claims.

In the drawings:

Figure 1 is a face view of a mount card embodying this invention.

Figure 2 is a face view of the mount including a diagrammatic representation of a pair of stereoscopic prints secured thereto.

Figure 3 is a rear face view of one corner of the mount showing another method of attaching a print thereto.

Figure 4 is a front face view of the structure indicated in Figure 3.

Figure 5 is a face view of a gummed corner fastener.

As is well understood, stereoscopic views are made by means of a special camera having twin lenses whose centers are spaced apart by approximately the average distance between the human eyes, so that the two pictures which are taken simultaneously through these lenses differ slightly. When properly mounted and viewed through the well known "stereoscope" so that one picture is seen by one eye and the other picture is seen by the other eye of the observer, the resultant blending of the views enhances the perspective effect, giving a more realistic appearance than can be secured in a single picture. When the two photographic exposures are made in a continuous strip of film or on a single plate, it is possible to make both prints from this negative simultaneously, but owing to the transposition from right to left which is incident to the photographic process, the prints must afterward be cut apart and re-mounted in transposed relation to produce the correct final impression. In re-mounting though, the photographer must take care that the centers of the pictures are spaced apart by the correct distance; otherwise, there will be difficulty in focusing the two views in the stereoscope.

My invention consists in a special form of mount card, A, having a pair of rectangular outlines defined in side by side relation with their centers, B, B, spaced apart at the correct distance for stereoscopic work. As shown, the rectangular outlines are defined by right angle slots, C, cut through the material so as to form the corner of each rectangle as well as a considerable portion of the outline. The outlines are interrupted at D so that the material of each rectangle is left attached to the marginal portions of the card, A.

Figure 2 includes a diagrammatic representation of a pair of prints, E and F, which are preferably made with contrasting borders $E^1$ and $F^1$. The picture area within these borders is substantially the same as that of the rectangular outlines formed by the slots, C. The slots are of sufficient width to transmit light so that if the picture be laid over them on the mount and held up to the light, the slots will be visible through the picture sheet and will thus serve as guide lines which should be registered with the edges of the picture area, or at least uniformly spaced from those edges, to insure proper centering of each picture on the mount. The mount card, A, is also provided with additional guide lines, as indicated at L, comprising partial outlines of slightly larger rectangles concentric with those outlined by the slots C, so that by laying the prints, E and F, over the slots, they can be placed so that when their picture areas just register with the rectangles defined by the slots, the outer edge of the borders, $E^1$ and $F^1$, will coincide with the guide lines, L, and in this way the centers of the pictures indicated at G, G, will be spaced apart by the correct distance. This method may be employed if the pictures are so thick or opaque that the slots cannot be viewed through them; it is also of convenience for centering a slightly larger standard size of picture than that corresponding to the slot-defined rectangles. When correctly located, the prints may then be mounted on the card, A, with any suitable paste applied to the back of the prints and to the face of the card, but in Figure 2, I have shown them attached by means of gummed paper corner fasteners, K, which are more fully illustrated in Figure 5. Each of these fasteners is of right-angular form and is made with a right-angular slit, K¹, with short terminal slits, K², whose length is about equal to the width of the borders, E¹ and F¹, of the pictures. This allows the fastener to be applied to the print, E or F by inserting a corner of the print in the slit so that the parts, K³, extend transversely of the margin of the picture with its gummed under side secured thereto, and the portion of the fastening adjacent the slit, K¹, together with the terminal portions, K⁵, beyond slits, K², underlie the marginal border. The remainder of the under surface of the fastener, K, being also gummed, adheres to the face of the card, A, for holding the print in position. The fasteners, K, may be so dimensioned that they will just fit in abutting relation in the space, H, between the prints, E and F, as clearly shown in Figure 2. It will be understood that the prints may have their borders trimmed off, so that the picture area of the print may be registered with the area defined by slots, C. In mounting prints thus trimmed it is preferable to attach them directly to the mounting card, as by paste of mucilage although, if desirable, corner fasteners may be employed in the usual manner.

Figures 3 and 4 illustrate another method of using the card, A, so that it will serve as a frame or mat for the pictures. This is done by first cutting through the card at the points, D, with a sharp knife, or with scissors, so as to connect the angular slots, C, and remove the two rectangular areas bounded by them. The margins, E¹ and F¹, of the prints may then be lapped against the back surface, A¹, of the card, A, so as to be secured and leave only the picture area itself showing through the rectangular openings. The lapped margins of the prints may be secured to the mount card, A, with paste or mucilage or the fasteners, K, may be used as indicated in Figures 3 and 4. In this case, the gummed surface of the fastener is disposed facing forwardly and the corner of the picture is inserted through the angular slit, K¹, as before. The area, K³, of the fastener at the inner side of the angular slit, K¹, is lapped over the back, E², of the picture, E, and the angular area, K⁴, which extends outside the outline of the print, E, is exposed toward the back side, A¹, of the card and gummed thereto. This leaves the fastener, K, entirely concealed while providing a firm mounting for the print.

I claim:
1. A mount for stereoscopic prints having two rectangular openings therein, each opening approximating the size of picture area of one print, said openings being spaced apart a distance for proper focusing to the human eyes through a stereoscope, said prints being secured to the back side of the mount with the picture area thereof, registering with the openings.

2. A mount for stereoscopic prints having guide lines thereon with which the marginal edges of a pair of spaced prints may be registered to insure correct spacing for observation through a stereoscope, said guide lines comprising a plurality of slots cut through the mount, defining two rectangular outlines, each having substantially the same area as the picture area of one print, and corner fastening members for securing the prints to the mount.

3. A mount for stereoscopic prints having two rectangular outlines of broken lines cut through the mount, such lines comprising slots of sufficient width for the transmission of light therethrough, each rectangle approximating the size of one print and the rectangles being spaced apart by the correct distance for proper blending of the two views when the prints are centered with respect to said rectangles respectively, and viewed through a stereoscope.

4. In combination with a mount for stereoscopic prints, attaching members for securing a pair of prints side by side to the mount, the members on the adjacent sides of the prints being dimensioned to abut against each other to secure proper spacing of said prints for blending the views when observed through a stereoscope.

5. A mount for stereoscopic prints having two sets of guide lines thereon, one set comprising a plurality of light transmitting slots defining a pair of rectangular outlines whose centers are spaced apart by the proper distance for stereoscopic use, and the other set comprising lines perpendicular to each other locating a pair of larger rectangles respectively concentric with the first pair.

ALBERT W. ENGEL.